United States Patent
Seo et al.

(10) Patent No.: US 8,146,118 B2
(45) Date of Patent: Mar. 27, 2012

(54) RECORDING MEDIUM HAVING A DATA STRUCTURE FOR MANAGING REPRODUCTION OF MENU DATA AND RECORDING AND REPRODUCING APPARATUSES AND METHODS

(75) Inventors: Kang Soo Seo, Kyunggi-do (KR); Jea Yong Yoo, Seoul (KR); Byung Jin Kim, Kyunggi-do (KR); Hyung Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 910 days.

(21) Appl. No.: 09/876,793

(22) Filed: Jun. 7, 2001

(65) Prior Publication Data

US 2001/0052127 A1 Dec. 13, 2001

(30) Foreign Application Priority Data

Jun. 9, 2000 (KR) .................... 2000-31821

(51) Int. Cl.
*H04N 5/445* (2011.01)
*H04N 9/80* (2006.01)
(52) U.S. Cl. .......... 725/41; 386/241
(58) Field of Classification Search .......... 725/43, 725/37, 44, 41; 386/241
See application file for complete search history.

(56) References Cited

U.S. PATENT DOCUMENTS

| | | | |
|---|---|---|---|
| 4,439,759 A | 3/1984 | Fleming et al. | |
| 5,539,716 A | 7/1996 | Furuhashi | |
| 5,583,560 A * | 12/1996 | Florin et al. | 725/40 |
| 5,636,631 A | 6/1997 | Waitz et al. | |
| 5,748,256 A | 5/1998 | Tsukagoshi | |
| 5,758,007 A | 5/1998 | Kitamura et al. | |
| 5,841,447 A | 11/1998 | Drews | |
| 5,912,710 A | 6/1999 | Fujimoto | |
| 5,917,830 A * | 6/1999 | Chen et al. | 370/487 |
| 5,929,857 A * | 7/1999 | Dinallo et al. | 715/840 |
| 5,963,704 A | 10/1999 | Mimura et al. | |
| 5,999,160 A | 12/1999 | Kitamura et al. | |
| 6,009,234 A | 12/1999 | Taira et al. | |
| 6,035,055 A | 3/2000 | Wang et al. | |
| 6,046,778 A | 4/2000 | Nonomura et al. | |
| 6,072,832 A | 6/2000 | Katto | |
| 6,088,507 A | 7/2000 | Yamauchi et al. | |
| 6,112,011 A | 8/2000 | Hisatomi | |
| 6,115,529 A | 9/2000 | Park | |

(Continued)

FOREIGN PATENT DOCUMENTS

CN 1151586 6/1997

(Continued)

OTHER PUBLICATIONS

"Digital Video Broadcasting (DVB); Subtitling systems," European Standard (Telecommunications series), Final Draft ETSI EN 300 743, V1.2.1 (Jun. 2002).

(Continued)

*Primary Examiner* — James R Sheleheda
(74) *Attorney, Agent, or Firm* — Harness, Dickey & Pierce (57) ABSTRACT

The recording medium includes a data structure having a menu data area and a menu management area. The menu data area stores one or more thumbnail pictures as menu data. Each thumbnail picture is stored as a block of menu data. The menu management area stores menu management information. The menu management information provides an index to each thumbnail picture in the menu data area.

8 Claims, 8 Drawing Sheets

U.S. PATENT DOCUMENTS

| | | | |
|---|---|---|---|
| 6,134,383 A | 10/2000 | Kikuchi et al. | |
| 6,167,189 A | 12/2000 | Taira et al. | |
| 6,167,192 A | 12/2000 | Heo | |
| 6,167,410 A | 12/2000 | Imamura | |
| 6,204,883 B1 | 3/2001 | Tsukagoshi | |
| 6,226,446 B1 | 5/2001 | Murase et al. | |
| 6,233,393 B1* | 5/2001 | Yanagihara et al. | 386/125 |
| 6,246,402 B1 | 6/2001 | Setogawa et al. | |
| 6,246,790 B1 | 6/2001 | Huang et al. | |
| 6,286,001 B1 | 9/2001 | Walker et al. | |
| 6,330,210 B1 | 12/2001 | Weirauch et al. | |
| 6,335,742 B1* | 1/2002 | Takemoto | 715/781 |
| 6,366,732 B1 | 4/2002 | Murase et al. | |
| 6,393,196 B1 | 5/2002 | Yamane et al. | |
| 6,433,801 B1 | 8/2002 | Moon et al. | |
| 6,445,877 B1 | 9/2002 | Okada et al. | |
| 6,470,460 B1 | 10/2002 | Kashiwagi et al. | |
| 6,483,983 B1* | 11/2002 | Takahashi et al. | 386/46 |
| 6,504,996 B1* | 1/2003 | Na et al. | 386/125 |
| 6,539,166 B2 | 3/2003 | Kawamura et al. | |
| 6,553,180 B1 | 4/2003 | Kikuchi et al. | |
| 6,574,417 B1* | 6/2003 | Lin et al. | 386/70 |
| 6,707,459 B1 | 3/2004 | Graves et al. | |
| 6,711,287 B1 | 3/2004 | Iwasaki | |
| 6,724,981 B1* | 4/2004 | Park et al. | 386/125 |
| 6,728,477 B1* | 4/2004 | Watkins | 386/125 |
| 6,792,154 B1 | 9/2004 | Stewart | |
| 6,847,777 B1 | 1/2005 | Nakamura | |
| 6,850,228 B1 | 2/2005 | Parks et al. | |
| 6,871,008 B1 | 3/2005 | Pintz et al. | |
| 6,889,001 B1* | 5/2005 | Nikaido et al. | 386/125 |
| 7,072,401 B2 | 7/2006 | Kim et al. | |
| 7,167,637 B2 | 1/2007 | Mori et al. | |
| 7,236,687 B2 | 6/2007 | Kato et al. | |
| 2001/0028789 A1* | 10/2001 | Uchide | 386/111 |
| 2001/0036322 A1 | 11/2001 | Bloomfield et al. | |
| 2001/0052127 A1 | 12/2001 | Seo et al. | |
| 2002/0006165 A1 | 1/2002 | Kato | |
| 2002/0006273 A1 | 1/2002 | Seo et al. | |
| 2002/0089516 A1 | 7/2002 | Sobol | |
| 2002/0174430 A1 | 11/2002 | Ellis et al. | |
| 2003/0133699 A1* | 7/2003 | Ando et al. | 386/95 |
| 2003/0152365 A1 | 8/2003 | Nagayama | |
| 2003/0179900 A1 | 9/2003 | Tian et al. | |
| 2004/0047591 A1 | 3/2004 | Seo et al. | |
| 2005/0045481 A1 | 3/2005 | Kawaguchi et al. | |
| 2006/0045481 A1 | 3/2006 | Yahata et al. | |
| 2006/0064716 A1 | 3/2006 | Sull et al. | |
| 2006/0143666 A1 | 6/2006 | Okada et al. | |
| 2006/0153535 A1 | 7/2006 | Chun et al. | |
| 2006/0165388 A1 | 7/2006 | Uesaka et al. | |
| 2006/0188223 A1 | 8/2006 | Ikeda et al. | |
| 2006/0282775 A1 | 12/2006 | Yahata et al. | |
| 2007/0057969 A1 | 3/2007 | McCrossan et al. | |
| 2007/0133948 A1 | 6/2007 | Kikuchi et al. | |

FOREIGN PATENT DOCUMENTS

| | | |
|---|---|---|
| CN | 1156377 | 8/1997 |
| CN | 1167311 | 12/1997 |
| CN | 1242575 | 1/2000 |
| CN | 1251461 | 4/2000 |
| CN | 1103102 | 3/2003 |
| CN | 1745579 | 3/2006 |
| CN | 101026775 | 8/2007 |
| EP | 0782338 | 7/1997 |
| EP | 0831647 | 3/1998 |
| EP | 0724264 | 12/1998 |
| EP | 0898279 | 2/1999 |
| EP | 0913822 | 5/1999 |
| EP | 1021048 | 1/2000 |
| EP | 1223580 | 7/2002 |
| EP | 1608165 | 12/2005 |
| EP | 1868190 | 12/2007 |
| JP | 4328375 A | 11/1992 |
| JP | 06-319125 | 11/1994 |
| JP | 6319125 | 11/1994 |
| JP | 8-298554 | 11/1996 |
| JP | 8298554 | 11/1996 |
| JP | 8-329004 | 12/1996 |
| JP | 8-339663 | 12/1996 |
| JP | 8329004 | 12/1996 |
| JP | 8339663 | 12/1996 |
| JP | 9135412 A | 5/1997 |
| JP | 10-215409 | 8/1998 |
| JP | 11-018048 | 1/1999 |
| JP | 11018048 | 1/1999 |
| JP | 1999-185463 | 7/1999 |
| JP | 11176137 A | 7/1999 |
| JP | 11213628 A | 8/1999 |
| JP | 11-298860 | 10/1999 |
| JP | 11298860 | 10/1999 |
| JP | 2000-083216 | 3/2000 |
| JP | 2000083216 | 3/2000 |
| JP | 2000-100073 | 4/2000 |
| JP | 2000-132953 | 5/2000 |
| JP | 2000132953 | 5/2000 |
| JP | 2000-222861 | 8/2000 |
| JP | 2000-261802 | 9/2000 |
| JP | 2000261802 | 9/2000 |
| JP | 2001-184839 | 7/2001 |
| JP | 2001-312880 | 11/2001 |
| JP | 2002-056651 | 2/2002 |
| JP | 2002-067533 | 3/2002 |
| JP | 2002-153684 | 5/2002 |
| JP | 2002-344805 | 11/2002 |
| JP | 2003-009096 | 1/2003 |
| KR | 1994-0016014 | 7/1994 |
| KR | 1996-0025645 | 7/1996 |
| KR | 2001-0111247 | 12/2001 |
| KR | 2002-0064463 | 8/2002 |
| WO | WO 00/30357 | 5/2000 |
| WO | WO 00/30358 | 5/2000 |
| WO | WO 00/31980 | 6/2000 |
| WO | WO 00/36600 | 6/2000 |
| WO | WO 00/60598 | 10/2000 |
| WO | WO 2004/098193 | 11/2004 |
| WO | WO 2004/114658 | 12/2004 |
| WO | WO 2005/002220 | 1/2005 |
| WO | WO 2005/052941 | 6/2005 |
| WO | WO 2005/078727 | 8/2005 |

OTHER PUBLICATIONS

"MPEG-2: Tutorial Introduction to the System Layer," P.A. Sarginson, The Institute of Electronic Engineers, 1995.
Russian Office Action dated May 5, 2008.
European Search Report dated Sep. 1, 2008.
Chinese Office Action dated Aug. 1, 2008.
"Digital Video Broadcasting (DVB); Subtitling Systems," European Standard(Telecommuting series), ETSI EN 300 743 V1.2.1, Jun. 2002.
Chinese Office Action dated Aug. 1, 2008 with English translation.

* cited by examiner

FIG. 1

Conventional Art

: *mark for a selected menu item*

FIG. 8

*Structure of Menu Data Stream for VSB-modulated transmission*

FIG. 9

*Menu Data Transmitting Method Through VSB-modulation*

FIG. 10

*Structure of Menu Data Stream for transmission through IEEE 1394*

FIG. 11

*Menu Data Transmitting Method Through IEEE 1394*

US 8,146,118 B2

RECORDING MEDIUM HAVING A DATA STRUCTURE FOR MANAGING REPRODUCTION OF MENU DATA AND RECORDING AND REPRODUCING APPARATUSES AND METHODS

BACKGROUND OF THE INVENTION

1. Field of the Invention

The present invention relates to a recording medium having a data structure for managing reproduction of menu data and recording reproducing apparatuses and methods.

2. Description of the Related Art

Figure 1:
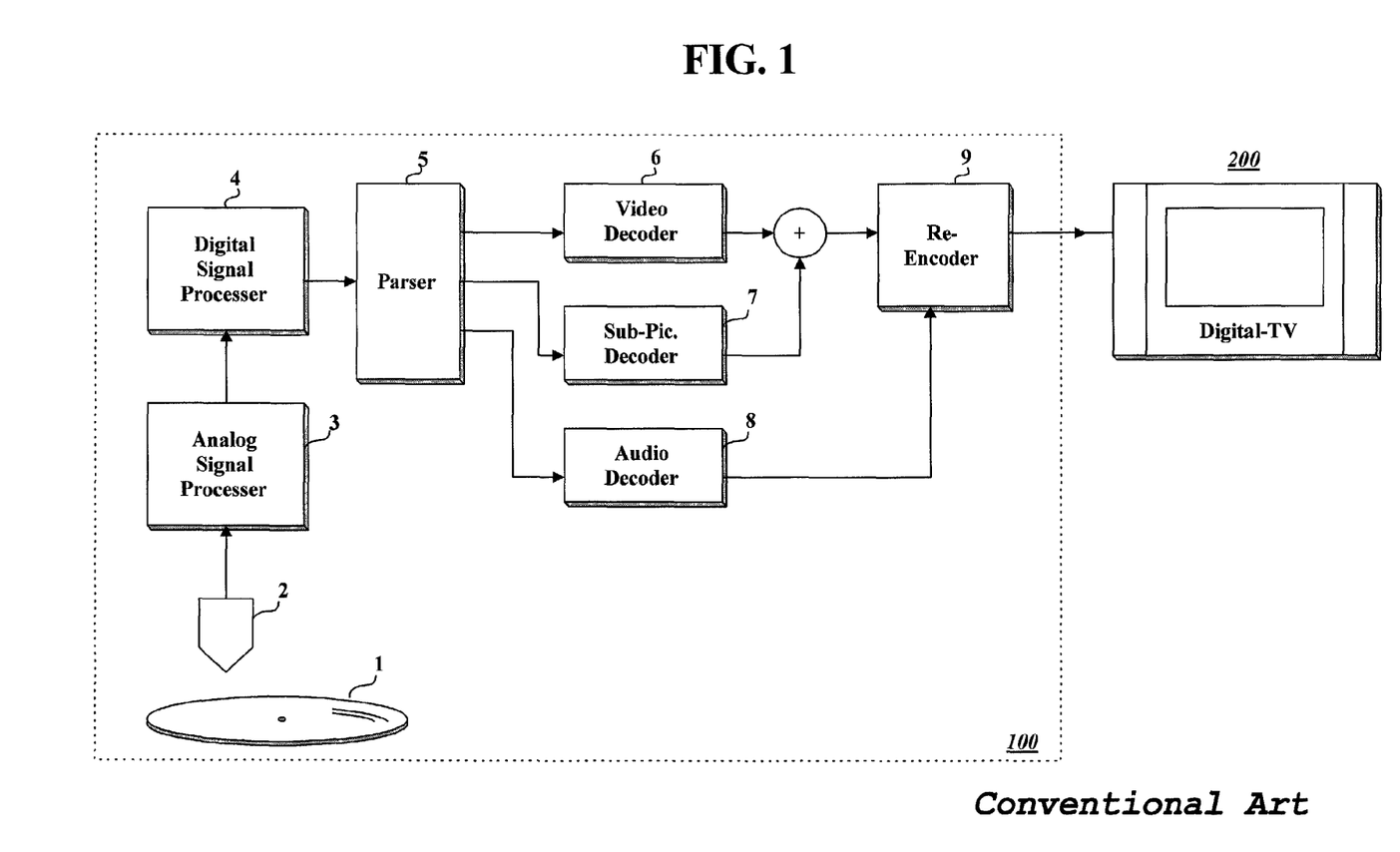
FIG. 1 shows a block diagram of a conventional DVD player capable of reproducing a DVD.

FIG. 1 shows a block diagram of a conventional DVD (Digital Versatile Disk) player capable of reproducing a DVD and providing the reproduced data for a digital television set. The player 100 of FIG. 1 comprises an optical pickup 2 reading signals recorded in a DVD 1; an analog signal processor 3 binarizing the read signals after compensating levels of the signals; a digital signal processor 4 restoring the binarized signals into digital data; a parser 5 separating the restored data into encoded video, sub-picture, and audio data; a video decoder 6 decoding the encoded video data to non-compressed original video data; a sub-picture decoder 7 decoding the sub-picture data; an audio decoder 8 decoding the encoded audio data to non-compressed original audio data; and a re-encoder 9 encoding the decoded audio and mixed data of the decoded video and sub-picture data again to audio and video streams whose format is suitable to a digital television set 200.

In the DVD player 100, the signals read by the pickup 2 are restored to original video and audio data and then re-encoded to an A/V stream acceptable to the digital TV set 200. The acceptable data stream is transmitted to the digital TV set 200, which presents the received video and audio data of the data stream through its screen and speaker, respectively.

The read and separated sub-picture data, which includes captions and menu data, are mixed, after being decoded, with the decoded original data from the video decoder 6, and are re-encoded to a TV acceptable A/V data stream. Therefore, the digital TV set 200 should be able to separate sub-picture data from the mixed video data and process it in order to present menu picture and/or captions for titles and/or chapters recorded in the DVD 1 on its screen.

However, in general, a digital TV set does not function to separate and decode sub-picture data for a menu, and present it with a background picture in still for a user's menu selection. In addition, it does not have a menu supporting function such as highlighting a specific window on a full screen according to an arbitrary selection from a user. Therefore, in order to construct a menu screen, a DVD player has to search both video data for background and sub-picture data for menu items such as highlighted box, etc.; and then decode each data, mix them, and re-encode the mixed data to produce a data stream suitable to a digital TV set.

However, such operations have a drawback that very complicated hardware is required for constructing a menu screen.

In the meantime, a reproducing/recording apparatus of a high-density recording medium such as a high-density DVD (called 'HDVD' hereinafter), whose recording format standard is under discussion among related companies, is most likely to be connected with a digital TV set to make a presentation of recorded high-quality moving pictures much better. Thus, a new efficient method, other than the above, is urgently required in order that titles or chapters recorded in a high-density recording medium may be selected in a menu displayed on a digital TV set.

SUMMARY OF THE INVENTION

The recording medium according to the present invention includes a data structure for managing reproduction of menu data recorded on the recording medium.

In one exemplary embodiment, a menu data area of the recording medium stores one or more thumbnail pictures as menu data. In this embodiment, each thumbnail picture is stored as a block of menu data. Furthermore, a menu management area of the recording medium stores menu management information. The menu management information provides an index to each thumbnail picture in the menu data area.

In another embodiment, the menu data area stores at least one thumbnail picture that is associated with a playback unit of video data recorded in a data area of the recording medium.

In yet another example embodiment, the menu data area records padding data between at least two of the blocks of menu data.

In an embodiment, the menu management information indicates a size of each block of menu data, and/or may also indicate a number of the thumbnail pictures stored in the menu data area.

The present invention further provides apparatuses and methods for recording and reproducing the data structure according to the present invention.

BRIEF DESCRIPTION OF THE DRAWINGS

The accompanying drawings, which are included to provide a further understanding of the invention, illustrate the exemplary embodiments of the invention, and together with the description, serve to explain the principles of the present invention.

In the drawings.

DETAILED DESCRIPTION OF THE PREFERRED EMBODIMENT

In order that the invention may be fully understood, exemplary embodiments thereof will now be described with reference to the accompanying drawings.

Figure 2:
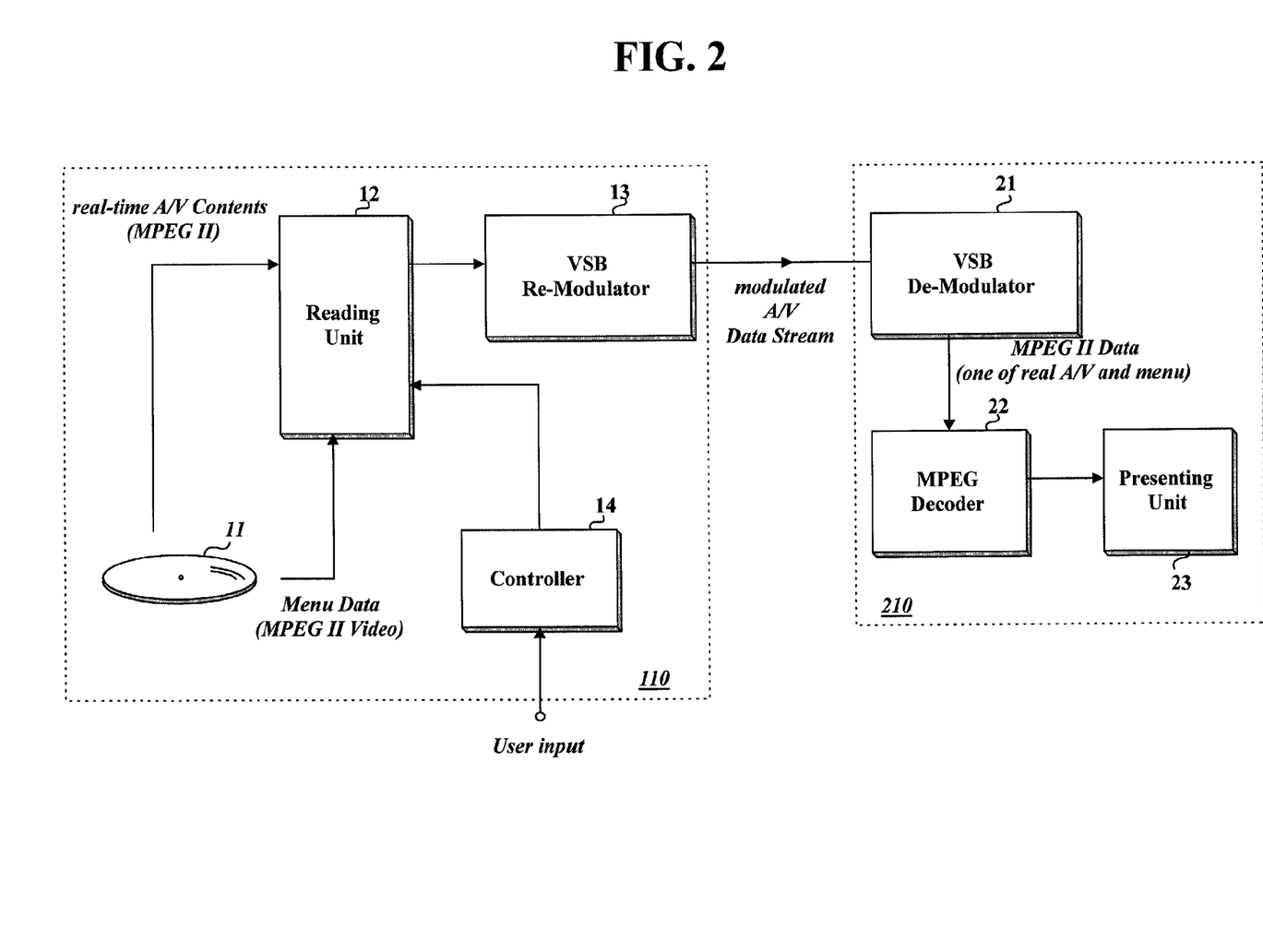
FIGS. 2 and 3 are schematic block diagrams of a high-density DVD player and a digital television set to which the recording medium and methods of the present invention are applicable.

FIG. 2 is a schematic block diagram of a HDVD player and a digital television set to which the recording medium and methods of the present invention are applicable.

A HDVD player 110 of FIG. 2 comprises a reading unit 12 searching A/V data and menu video data, which have been encoded according to the MPEG II standard, on a recording medium 11, and reading out this data; a controller 14 conducting reproduction operations by controlling the reading unit 12 according to playback requests from a user; and a re-modulator 13 modulating the read A/V data or menu video data with VSB (Vestigial Side Band) for reproduction on a digital television set 210. The digital television set 210 of FIG. 2 comprises a demodulator 21 demodulating the modulated signal from the high-density DVD player 110 with VSB; an MPEG decoder 22 decoding the demodulated data stream to original video and audio data, if included; and a presenting unit 23 presenting the decoded video and audio data.

The reading unit 12 reproduces the recorded data of a selected type among A/V, menu, and navigation data. The controller 14 controls the reading unit 12 to select the data type according to various user requests.

If program playback for a title or a chapter written in the high-density recording medium 11 is requested from a user, real-time A/V data are selected by the controller 14 and reproduced by the reading unit 12. The read A/V data are VSB-modulated by the re-modulator 13 to be transmitted to a digital television set 210. If menu display is requested, menu data are selected for reading out by the controller 14. Therefore, corresponding menu data are read by the reading unit 12 and are then VSB-modulated and transmitted. This menu data will be presented as a still picture by the digital television set 210.

Figure 3:
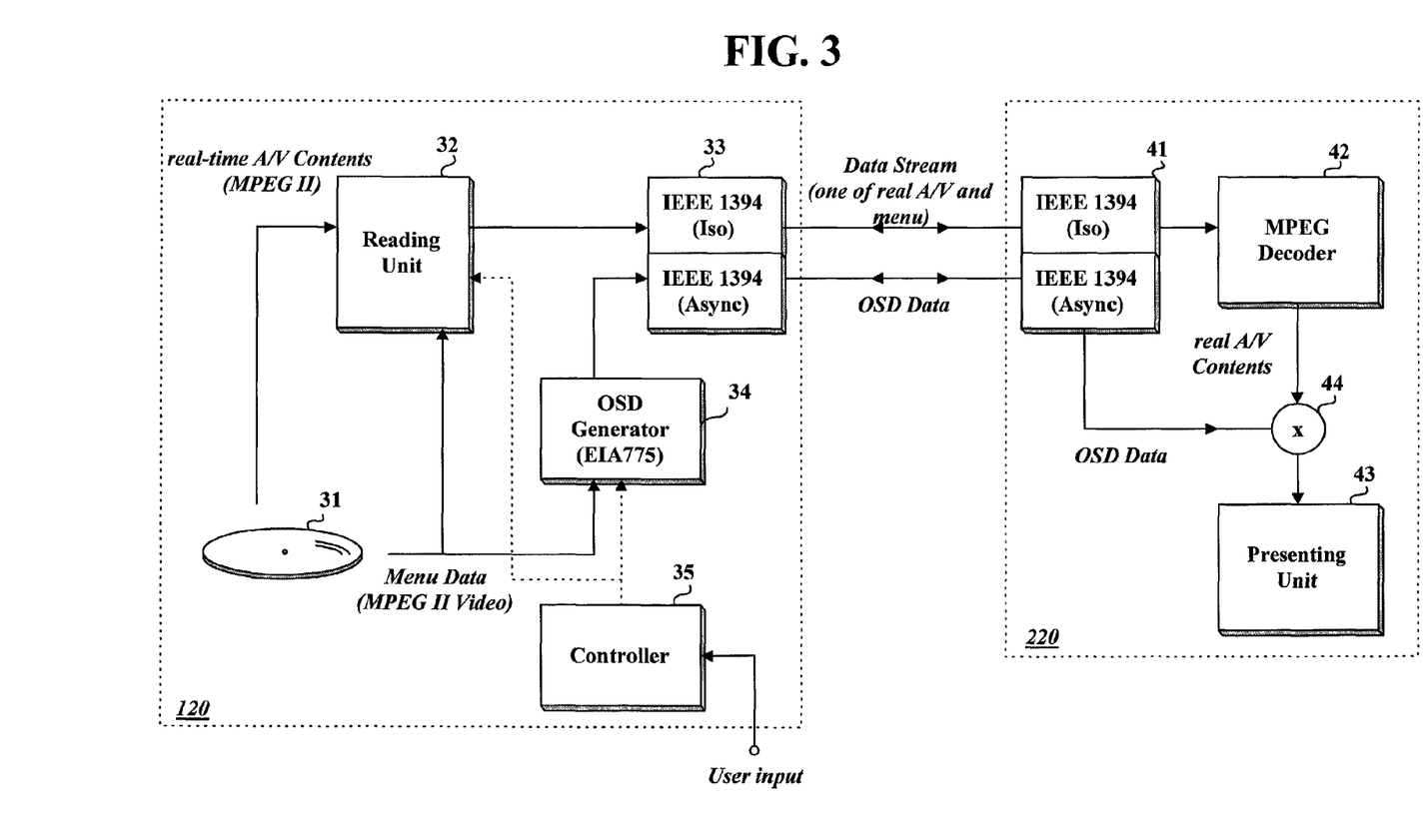

FIG. 3 is another schematic block diagram of a HDVD player and a digital television set to which another embodiment of the present invention is applicable.

A HDVD player 120 of FIG. 3 comprises a reading unit 32 searching real-time A/V data and menu video data, which have been encoded with MPEG II standard, on a recording medium 31, and reading out this data; an OSD (On Screen Display) data generator 34 generating OSD data, which will be mixed with menu video data in a digital television set to highlight a menu item or display a text, based on menu management information written in a HDVD 31; a controller 35 controlling the reading unit 32 and the OSD data generator 34 according to a user's request; and an interfacing unit 33 transmitting A/V data from the reading unit 32 through an isochronous channel of IEEE 1394 standard and OSD data from the OSD data generator 34 through an asynchronous channel, respectively.

The OSD data generated by the OSD data generator 34 satisfies the standard EIA775 for OSD data transmission.

A digital television set 220 of FIG. 3 comprises an interfacing unit 41 receiving A/V data and OSD data from the HDVD player 120 through isochronous and asynchronous channels, respectively; an MPEG decoder 42 decoding the received A/V data to original video and audio data, if included; a mixer 44 mixing the received OSD data and the decoded video data; and a presenting unit 43 presenting the decoded video and audio data.

The controller 35 of the HDVD player 120 controls the reading unit 32 to select a data type according to various user requests and to reproduce the recorded data of the selected type. The real-time A/V data and menu video data, which are for selecting a chapter or a title written in the HDVD 31, read by the reading unit 32 are transmitted to the digital television set 220 through the isochronous channel. In the case that menu video data are transmitted, the OSD data generator 34 generates OSD data for displaying a specific window as highlighted or for displaying descriptive text of a chapter or title item based on the read menu video data and the menu management information, and transmits the generated OSD data through asynchronous channel of the interfacing unit 33.

The digital television set 220 decodes the received A/V data and the menu video data using the MPEG decoder 42. The decoded data are mixed with OSD data, if received, by the mixer 44, and then presented through the presenting unit 43. The menu video data are displayed in still picture with the received OSD data which will be explained below.

Figure 4:
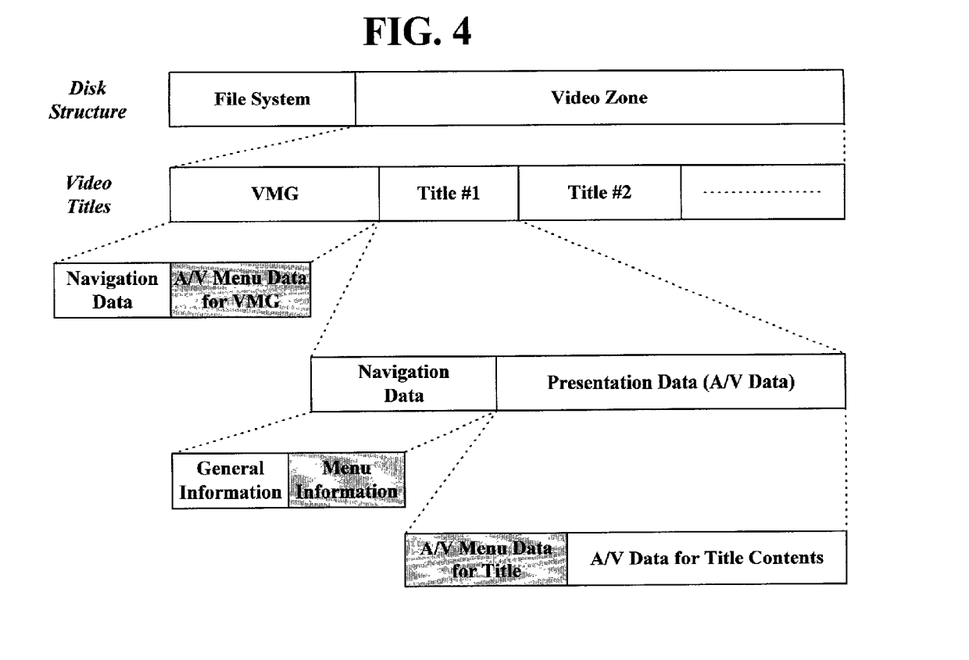
FIGS. 4 and 5 depict hierarchical data structures recorded in a high-density recording medium according to an embodiment of the present invention.

FIG. 4 depicts hierarchical data structure recorded in a high-density recording medium according to an embodiment of the present invention.

The high-density recording medium is partitioned into a file system area and video zone. The video zone contains several titles and VMG (Video Manager) data, which consist of A/V menu data for VMG and navigation data for the A/V menu data. Each title consists of real-time A/V presentation data and their navigation data, which includes general information and menu information. The presentation data consist of A/V menu data for a title and real-time A/V data of the title contents.

The A/V menu data for VMG included in the VMG data are for a top menu whose menu items are selection and/or alteration of title and disk information item, whereas the A/V menu data for titles included in the presentation data are for a sub menu whose menu items are selection and/or alteration of information of chapters belonging to a title items.

Figure 5:
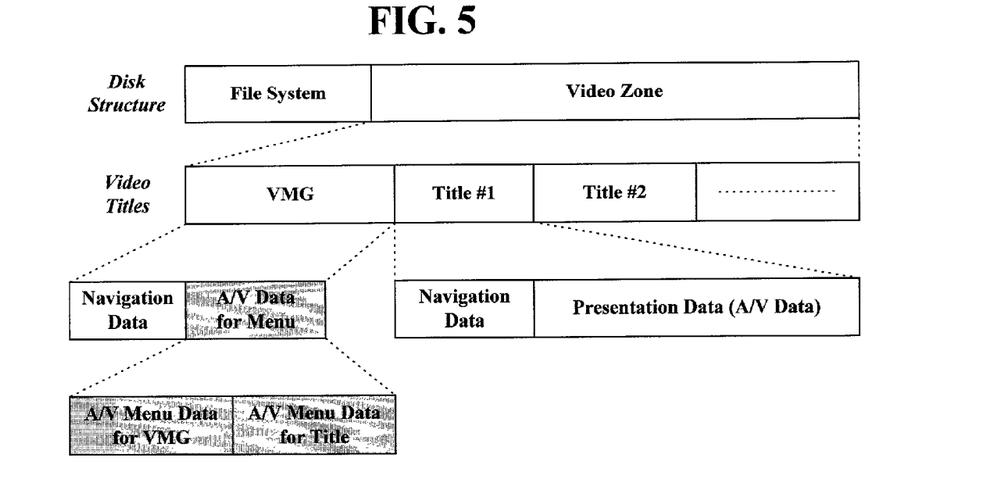

The A/V menu data for VMG may be partitioned into two menu sections of A/V menu data for VMG and A/V menu data for titles as shown in FIG. 5.

According to an embodiment of the present invention, an appropriate A/V menu data for selecting a title or a chapter recorded in a high-density recording medium with reference to menu navigation data written as above is read out, and the read A/V menu data is transmitted to a digital television set to be presented thereon. This method is described hereinafter in detail.

The menu supporting method to be explained is for the configuration of FIG. 3, which has an OSD function observing EIA775 standard and IEEE 1394 interface able to send/receive OSD data.

Figure 6:
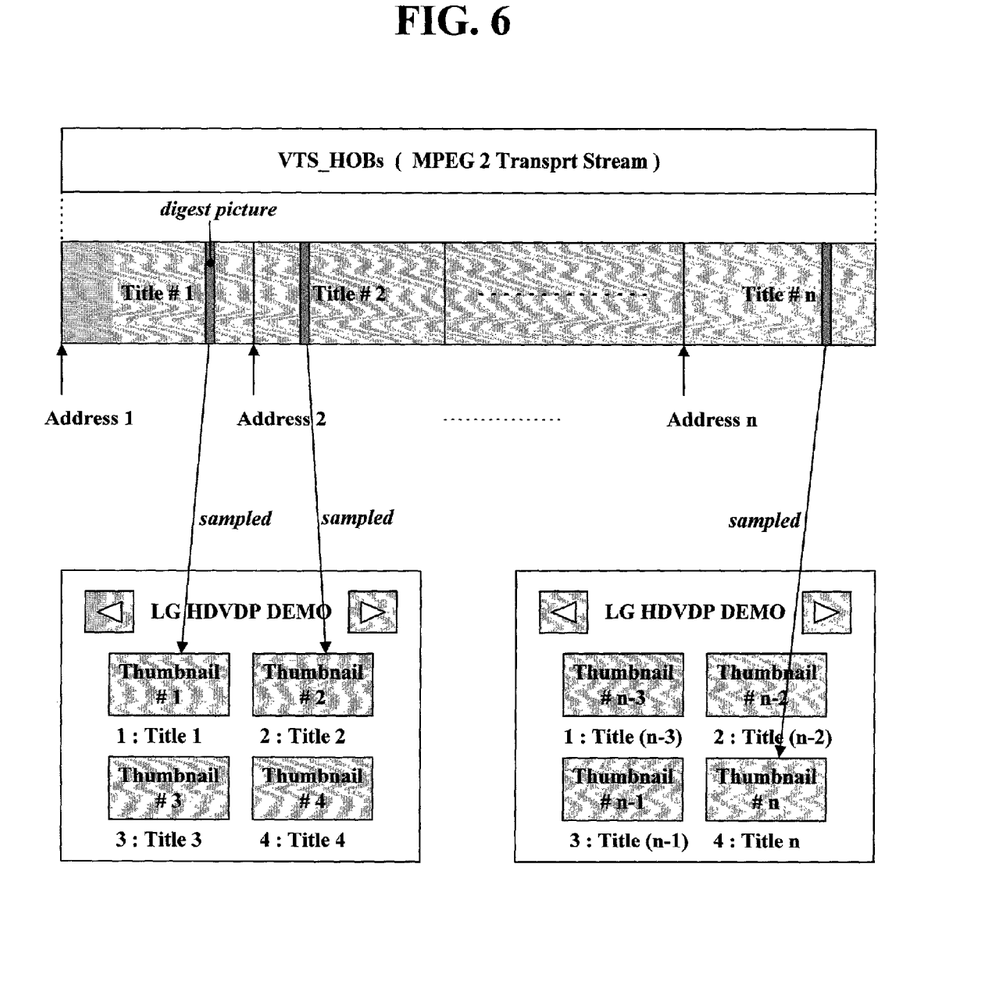
FIG. 6 depicts an embodiment of an organizing menu formed from real A/V data.

If a single menu page consists of six menu items of four thumbnails for titles and two direction icons to switch to a previous or a next menu page as shown in FIG. 6, then video menu data for each different basic menu page in which four thumbnails for four different titles and two icons will have been written as A/V menu data for VMG. The menu management information, which is used to generate OSD data necessary for indicating which menu item, that is, which title thumbnail is selected, has also been included in the A/V menu data for VMG. A thumbnail icon of a title or a chapter is composed of image data sampled from a picture included in a corresponding title or chapter as shown in FIG. 6.

Figure 10:
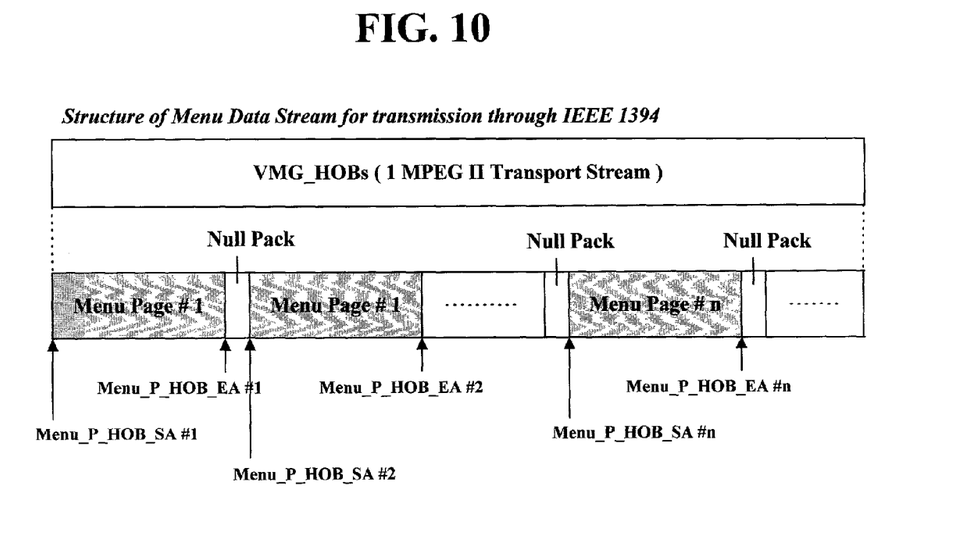
FIG. 10 is menu data stream format recorded in a high-density DVD according to another embodiment of the present invention.

Data of each basic menu page are grouped into a single high-density stream object (called 'HOB' hereinafter) as shown in FIG. 10.

In the case that menu data have been written as aforementioned, if six selected cases for a single menu page (for selecting one among titles 1 to 4) are to be furnished, one basic menu page is read and provided for a digital TV set. Also, mutually different OSD data for differentiating (e.g., highlighting) a selected menu item are generated based on a user's selection and related menu management information, and then provided to the digital TV set.

Figure 7:
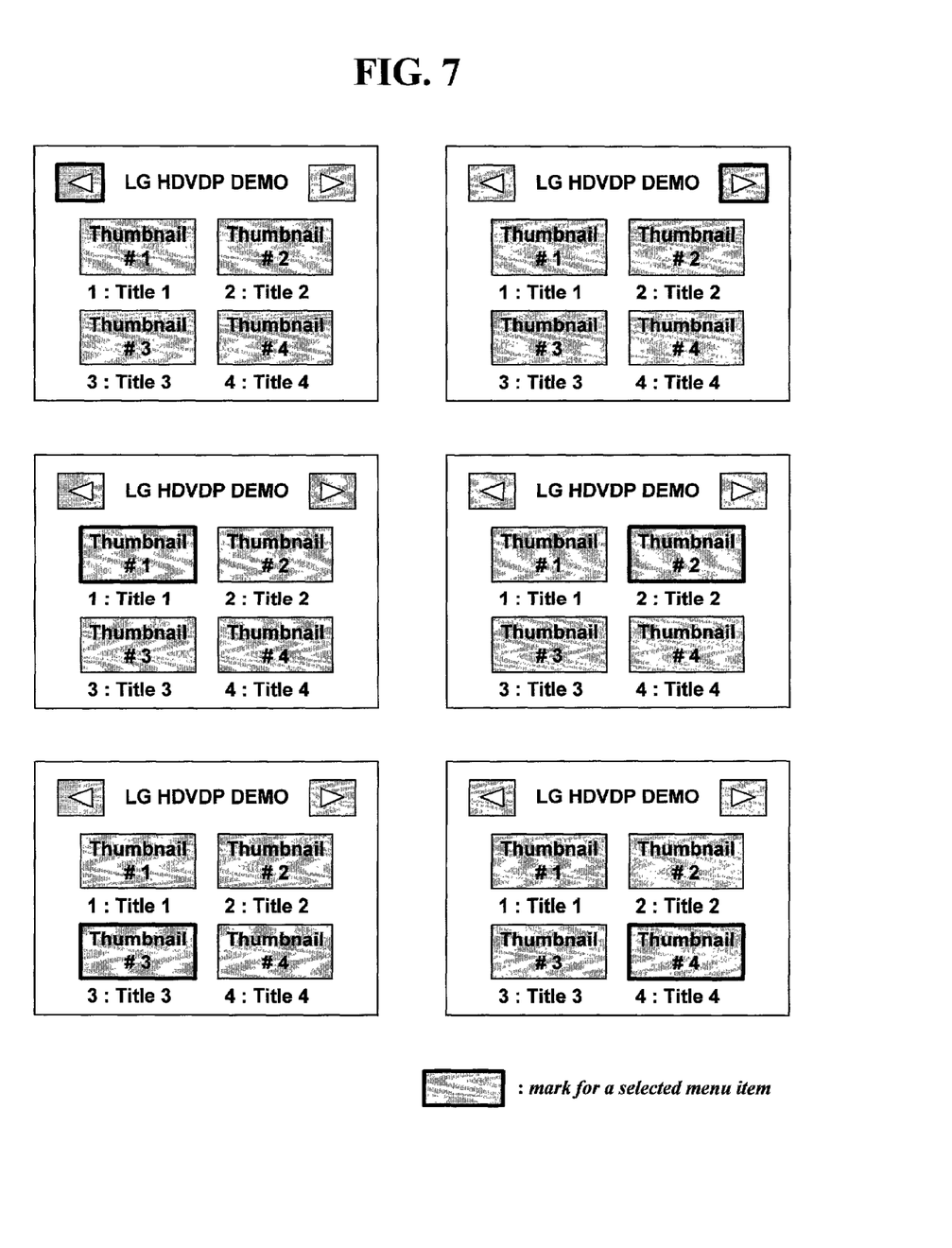
FIG. 7 shows various menu statuses output in accordance with different menu item selections.

To be brief, the six cases for item selection shown in FIG. 7 are built up by one basic menu page and six different OSD data.

Another menu supporting method to be explained is for the configuration of FIG. 2 in which a VSB-modulated signal is transmitted from a HDVD player to a digital TV set.

If a single menu page consists of six menu items of four thumbnails for titles and two direction icons like as in the above example, video data for six menu pictures will have been written for one menu page, for example, for selecting one among titles 1 to 4. Each menu picture is to distinguish which menu item is selected in a menu page.

To be brief, the six cases for item selection shown in FIG. 7 are built up by six mutually different menu pictures.

In this menu supporting method, data of each menu picture are grouped into a HOB.

Figure 8:
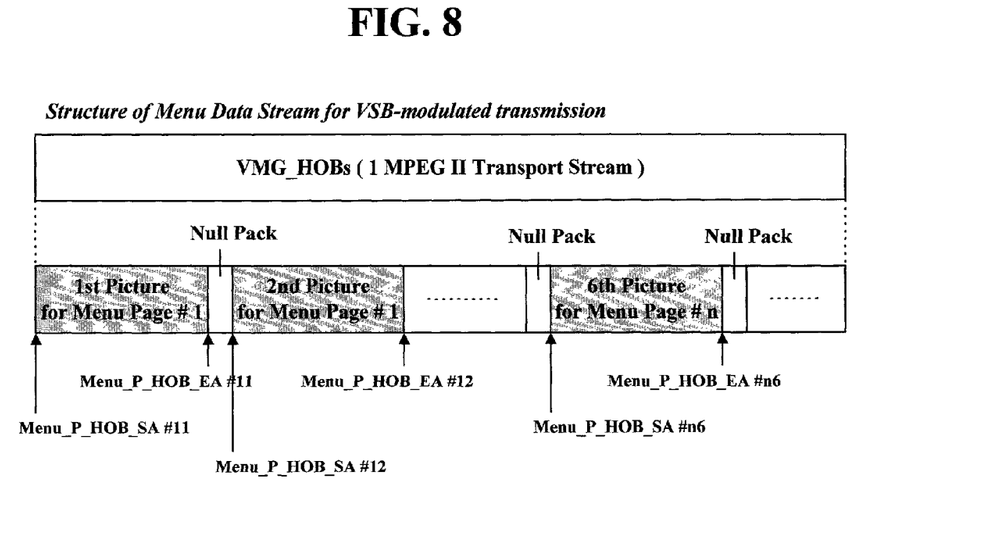
FIG. 8 is menu data stream format recorded in a high-density DVD according to an embodiment of the present invention.

FIG. 8 is menu data stream format recorded for the case that menu data are delivered through VSB modulation.

Menu data of all menu pictures, which are recorded in the format of an MPEG II transport stream, form a plurality of HOBs, called 'VMG HOBs'. The VMG HOBs consist of a HOB containing the first menu picture for the first menu item selected in the first menu page, next HOB containing the second picture for the second menu item selected in the first menu page, . . . , and the last HOB containing the last picture for the sixth menu item selected in the last menu page. A null data pack may be inserted between menu pictures, that is, neighboring two HOBs.

In addition, the address information of start ('Menu_P_HOB_SA's #11, #12, . . . , #n6, . . . ) and end ('Menu_P_HOB_EA's #11, #12, . . . , #n6, . . . ) for each menu HOB is written as the navigation data for the A/V menu data.

If an arbitrary menu item is selected by a user from the menu displayed according to a menu request, the controller 14 of the HDVD player 110 determines which menu picture is to be displayed based on the selected item and the menu management information. The controller 14 reads start and end addresses of a HOB associated with the determined menu picture from the menu navigation data. Referring to the read addresses, the controller 14 reads a data stream corresponding to a menu picture in which the selected menu item has been highlighted, and controls the reading unit 12 to select menu picture data instead of a real A/V data stream. Through these operations, a menu picture in which a selected menu item is differentiated distinctively from others is transmitted VSB-modulated, and displayed onto a screen of the digital television set 210.

Figure 9:
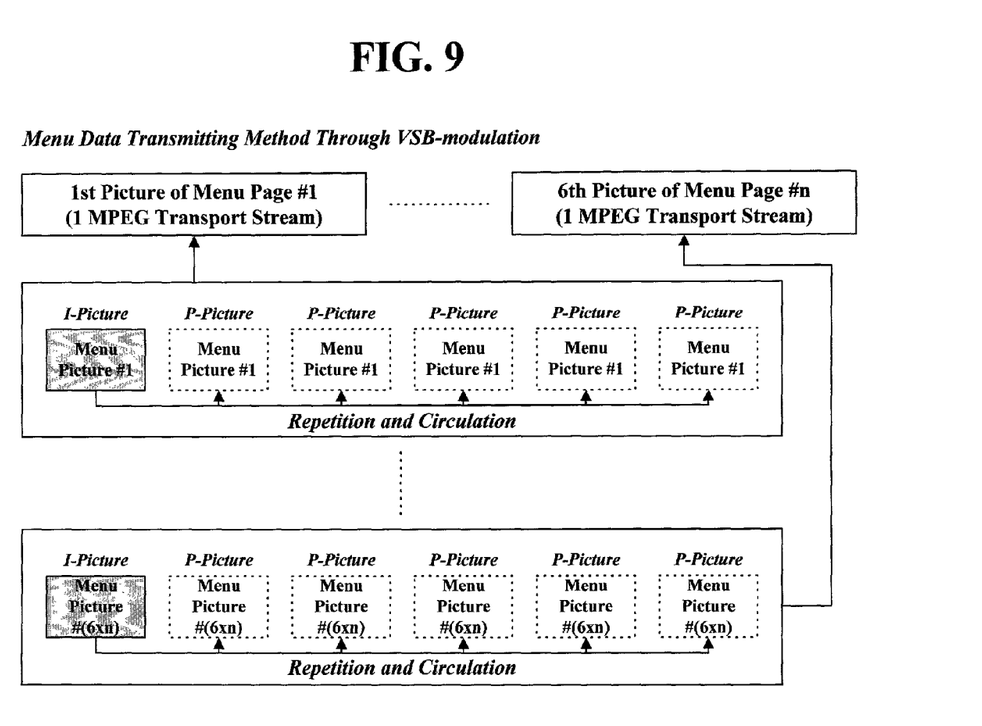
FIG. 9 depicts a menu data transmitting method according to an embodiment of the present invention.

In order that a menu picture may be displayed in still, data for a single menu picture consists of single Intra-coded picture (called an 'I-picture' hereinafter) and one or more predictive coded pictures (called 'P-pictures' hereinafter) as shown in FIG. 9. The P-picture represents a same picture as the I-picture, however, as is well-known, the data of a P-picture is compressed in a different manner than an I-picture. When transmitting data of a menu picture, one or more P-pictures may be sent sequentially, more than once, after the preceding I-picture is sent. The operation of transmitting an I-picture once and then one or more P-pictures is conducted repeatedly until another menu page or another menu item is selected by a user.

Therefore, the digital television set receives I-pictures and P-pictures continuously and displays the same page contents repeatedly. As a result, a menu page is presented to a user as a still picture without a special operation of a digital television set.

FIG. 10 is menu data stream format recorded for the case that OSD data for differentiating a menu item from others are delivered through digital interface of IEEE 1394.

In the data configured as FIG. 10, the VMG HOBs, which contain menu data of the MPEG II transport stream format, consist of a HOB containing the first menu page, a next HOB containing the second menu page, . . . , and the last HOB containing the last menu page. A null data pack may be appended to each menu page except the last page, that is, inserted between two neighboring HOBs. In addition, the address information of start ('Menu_P_HOB_SA's #1, #2, . . . , #n, . . . ) and end ('Menu_P_HOB_EA's #1, #2, . . . , #n, . . . ) addresses for each menu HOB is written as the navigation data for the A/V menu data. As will be appreciated, this address information provides an indication of the size of each new menu HOB. As will be further appreciated, the number of starting and ending address pairs also provides an indication of the number of menu HOBs (i.e., the number of thumbnail pictures).

If an arbitrary menu page is requested from a user, the controller 35 of the HDVD player 120 determines which menu page is to be displayed based on the menu management information, and reads start and end addresses of a HOB associated with the determined menu page from the menu navigation data. Referring to the read addresses, the controller 35 reads a data stream corresponding to a menu page to be transmitted through the isochronous channel of the interfacing unit 33. At the same time, the controller 35 searches the menu management information for information on highlighting a menu item selected in the transmitted menu page or displaying descriptive text of a selected menu item, and generates EIA775 standard-conformed OSD data corresponding to the information through the OSD data generator 34. This OSD data are transmitted to a digital television set through the asynchronous channel of the interfacing unit 33.

Figure 11:
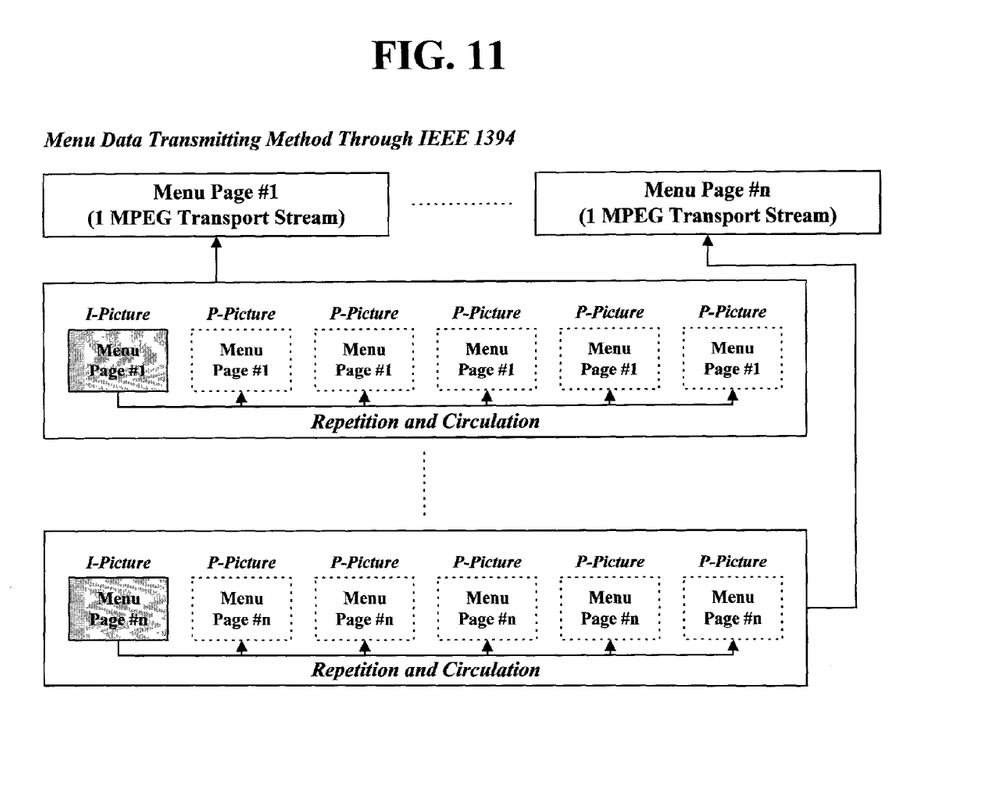
FIG. 11 depicts another menu data transmitting method according to an embodiment of the present invention.

As with the explanation for the case of FIG. 9, the transmitted data of a menu page are also composed of an I-picture and one or more P-pictures, which are sent in their recorded order, and repeatedly, as shown in FIG. 11. The unique difference between the cases of FIGS. 9 and 11 is that a basic menu page in which an OSD data will emphasize a selected menu item is transmitted in FIG. 11 whereas a menu picture in which a selected menu item has been already marked distinctly is sent in FIG. 9.

The above explained embodiments of the present invention provide for management of a selection menu for a high-density recording medium that a digital television set displays as a still picture. The embodiments further provide for differentiating the display of a selected menu item distinctly from other menu items so that it is possible for a user to know which menu item is selected at present and to choose a menu item of a title or a chapter to be reproduced from a high-density recording medium.

The invention may be embodied in other specific forms without departing from the sprit or essential characteristics thereof. The present embodiments are therefore to be considered in all respects as illustrative and not restrictive.

What is claimed is:

1. A method of reproducing menu data recorded on a computer-readable medium, the method comprising:

reading menu management information, a menu data file, and one or more playback units of video data from the computer-readable medium, the menu data file including a plurality of object units for recording thumbnail pictures, each thumbnail picture corresponding to one of the playback units, each thumbnail picture being recorded in one of the object units, the menu management information including size information indicating an actual data size of each thumbnail picture, and at least one thumbnail picture in the menu data file is selected based on a user selection and reproduced based on the menu management information, wherein the selected thumbnail picture includes an intra-coded picture (I-picture) and one or more predictive coded pictures (P-pictures), wherein the selected thumbnail picture is displayed by sequentially transmitting the I-picture and the P-pictures, wherein data recorded between thumbnail pictures is treated as padding data.

2. The method of claim 1, wherein the menu management information includes a starting address and an ending address of each thumbnail picture to indicate the actual data size of each thumbnail picture.

3. The method of claim 2, wherein a number of starting and ending address pairs indicates the number of the thumbnail pictures stored in the menu data file.

4. The method of claim 1, wherein the sequentially transmitting operation is repeated until another thumbnail picture is selected.

5. A reproduction apparatus, comprising:

a reproducing unit configured to read data recorded on a computer-readable recording medium; and a controller configured to control the reproducing unit to read menu management information, a menu data file, and one or more playback units of video data from the computer-readable medium, the menu data file including a plurality of object units for recording thumbnail pictures, each thumbnail picture corresponding to one of the playback units, each thumbnail picture being recorded in one of the object units, the menu management information including size information indicating an actual data size of each thumbnail picture, and a decoder configured to decode at least one thumbnail picture in the menu data file based on the menu management information, wherein the controller is configured to select at least one thumbnail picture in the menu data file based on a user selection and configured to reproduce the at least one thumbnail picture based on the menu management information, wherein the selected thumbnail picture includes an intra-coded picture (I-picture) and one or more predictive coded pictures (P-pictures), wherein the controller is configured to display the selected thumbnail picture by sequentially transmitting the I-picture and the P-pictures, wherein data recorded between thumbnail pictures is treated as padding data.

6. The apparatus of claim 5, wherein the controller controls the reproducing unit to read the menu management information including a starting address and an ending address of each thumbnail picture to indicate the actual data size of each thumbnail picture.

7. The apparatus of claim 6, wherein a number of starting and ending address pairs indicates the number of the thumbnail pictures stored in the menu data file.

8. The reproduction apparatus of claim 5, wherein the sequentially transmitting operation is repeated until another thumbnail picture is selected.

* * * * *